(12) United States Patent
Lin et al.

(10) Patent No.: US 10,180,144 B2
(45) Date of Patent: Jan. 15, 2019

(54) FAN, MOTOR STATOR STRUCTURE THEREOF, AND MANUFACTURING METHOD THEREOF

(71) Applicant: COOLER MASTER CO., LTD., New Taipei (TW)

(72) Inventors: Fu-Lung Lin, New Taipei (TW); Shih-Wei Huang, New Taipei (TW); Ai-Quan Wan, New Taipei (TW)

(73) Assignee: COOLER MASTER CO., LTD., New Taipei (TW)

( * ) Notice: Subject to any disclaimer, the term of this patent is extended or adjusted under 35 U.S.C. 154(b) by 416 days.

(21) Appl. No.: 14/873,927

(22) Filed: Oct. 2, 2015

(65) Prior Publication Data

US 2016/0102669 A1  Apr. 14, 2016

(30) Foreign Application Priority Data

Oct. 9, 2014 (CN) .......................... 2014 1 0527275

(51) Int. Cl.
| | |
|---|---|
| *H02K 1/14* | (2006.01) |
| *F04D 25/06* | (2006.01) |
| *H02K 7/14* | (2006.01) |
| *H02K 21/24* | (2006.01) |
| *H02K 1/18* | (2006.01) |
| *F04D 17/08* | (2006.01) |
| *F04D 29/053* | (2006.01) |
| *F04D 29/28* | (2006.01) |
| *F04D 29/42* | (2006.01) |

(Continued)

(52) U.S. Cl.
CPC .............. *F04D 25/06* (2013.01); *F04D 17/08* (2013.01); *F04D 29/053* (2013.01); *F04D 29/281* (2013.01); *F04D 29/4226* (2013.01); *F04D 29/624* (2013.01); *H02K 1/14* (2013.01); *H02K 1/148* (2013.01); *H02K 1/182* (2013.01); *H02K 3/18* (2013.01); *H02K 7/14* (2013.01); *H02K 21/24* (2013.01)

(58) Field of Classification Search
CPC ... H02K 1/12; H02K 1/14; H02K 3/18; F04D 25/08
USPC ....... 310/49.22, 49.23, 49, 24, 49.25, 254.1, 310/267, 268; 417/423.7
See application file for complete search history.

(56) References Cited

U.S. PATENT DOCUMENTS

| | | | | |
|---|---|---|---|---|
| 1,822,679 A | * | 9/1931 | Stewart | H02K 17/10 188/164 |
| 4,371,821 A | * | 2/1983 | Laesser | G04C 3/143 310/49.25 |

(Continued)

*Primary Examiner* — John K Kim
(74) *Attorney, Agent, or Firm* — Maschoff Brennan (57) ABSTRACT

A fan includes a metal plate (100), multiple cylindrical coils (300), a frame (130) and an impeller (400). Multiple teeth (110) annularly arranged and connected with each other are formed on the metal plate (100). Each cylindrical coil (300) is arranged between adjacent teeth (110), and each end of the cylindrical coil (300) is arranged toward corresponding tooth (110). The frame (130) is arranged on a surface of the metal plate (100) and extended along an edge of the metal plate (100). A flow channel (131) and an air outlet (132) connected to the flow channel (131) are formed by the frame (130). The impeller (400) is arranged in the flow channel (131). A stator structure of the fan is simplified by forming the teeth (11) on the metal plate (100).

7 Claims, 9 Drawing Sheets (51) Int. Cl.
*F04D 29/62* (2006.01)
*H02K 3/18* (2006.01)

(56) References Cited

U.S. PATENT DOCUMENTS

| | | | | |
|---|---|---|---|---|
| 4,680,494 A | * | 7/1987 | Grosjean | G04C 13/11 |
| | | | | 310/156.35 |
| 5,302,875 A | * | 4/1994 | Taghezout | H02K 37/14 |
| | | | | 310/162 |
| 2014/0035418 A1 | * | 2/2014 | Horst | H02K 21/16 |
| | | | | 310/156.12 |
| 2015/0240835 A1 | * | 8/2015 | Tsai | F04D 29/056 |
| | | | | 417/354 |
| 2016/0102669 A1 | * | 4/2016 | Lin | H02K 21/24 |
| | | | | 417/423.7 |
| 2016/0226330 A1 | * | 8/2016 | Li | H02K 5/18 |

* cited by examiner

FAN, MOTOR STATOR STRUCTURE THEREOF, AND MANUFACTURING METHOD THEREOF

FIELD OF THE INVENTION

The technical field relates to fans, more particularly to thin fan, a motor stator structure of the fan, and a manufacturing method of the fan.

BACKGROUND OF THE INVENTION

Most present existing electronic devices such as desktop computers, notebook computers, tablet PCs, etc are equipped with a fan for dissipating the heat generated during the operation of electronic components of the electronic devices. Since the electronic products tend to have an increasingly thinner design, the thickness of the fan motor becomes thinner and thinner. However, the conventional motor stator is composed of a plurality of silicon steel sheets stacked on one another, and thus the overall thickness cannot be reduced easily.

In view of the aforementioned problem of the prior art, the discloser of this disclosure based on years of experience in the industry to conduct extensive researches and experiments and finally provided a feasible solution to overcome the problems of the prior art effectively.

SUMMARY OF THE INVENTION

It is a primary objective of this disclosure to provide a thin fan and its manufacturing method.

This disclosure provides a motor stator structure comprising: a metal plate, forming a plurality of teeth connected to one another and annularly arranged; and a cylindrical coil, disposed between any two adjacent teeth 110, and both ends of the cylindrical coil 300 being configured corresponsive to the adjacent teeth 110 respectively.

Preferably, the motor stator structure further comprises a plurality of iron cores, each spanning across a pair of adjacent teeth, and each cylindrical coil being wound around each respective iron core. Both ends of each iron core has a through hole, and each tooth has a latch formed thereon and configured to be corresponsive to each respective through hole. Both ends of each iron core are latched to the adjacent teeth. Both ends of each iron core may be soldered to the adjacent teeth.

This disclosure further provides a fan, comprising a metal plate, a plurality of cylindrical coils, a frame and an impeller. The metal plate has a plurality of teeth formed thereon, connected to one another, and arranged annularly. A cylindrical coil is installed between any two adjacent teeth, and both ends of each cylindrical coil are configured to be corresponsive to the adjacent teeth respectively. The frame is protruded from a side of the metal plate, and the frame is extended along an edge of the metal plate to enclose and form a flow channel, and the frame has an air outlet communicated with the flow channel. The impeller is installed in the flow channel.

Preferably, the fan further comprises a plurality of iron cores, each spanning across two teeth, and each cylindrical coil is wound around the respective iron core. Both ends of each iron core are soldered to the adjacent teeth respectively, or latched to the adjacent teeth respectively. The metal plate has a shaft protruded from the metal plate and disposed in the flow channel and at the center of the annularly arranged teeth. The impeller has a circular bearing installed at the center of the impeller and sleeved and engaged to the shaft. A coil holder is installed between any two adjacent teeth, and the cylindrical coil is accommodated in the coil holder. The frame has a cover plate covered onto the top of the frame, and the cover plate has an air inlet configured to be corresponsive to the impeller.

This disclosure further provides a manufacturing method of a fan comprising the steps of: providing a metal plate, and removing a portion of the metal plate to form a plurality of teeth connected to one another and arranged annularly; forming a shaft at the center of the annularly arranged teeth; forming a frame on the metal plate and the frame enclosing the teeth; installing a cylindrical coil between any two adjacent teeth; pivotally installing an impeller to the shaft; providing a cover plate, and forming an air inlet on the cover plate; and installing the cover plate to the top of the frame to cover the impeller.

Preferably, the manufacturing method of a fan further comprises the step of installing a coil holder between any two adjacent teeth for accommodating the cylindrical coil, and forming a hook at an end of the shaft for fixing the impeller. Preferably, the frame and the shaft are formed simultaneously, or the frame, the shaft and the coil holder are formed simultaneously.

In the manufacturing method of a thin fan in accordance with this disclosure, the motor stator structure has the teeth formed on the metal plate to reduce the volume of the fan.

DESCRIPTION OF THE PREFERRED EMBODIMENTS

The technical contents of this disclosure will become apparent with the detailed description of preferred embodiments accompanied with the illustration of related drawings as follows. It is intended that the embodiments and figures disclosed herein are to be considered illustrative rather than restrictive.

Figure 1:
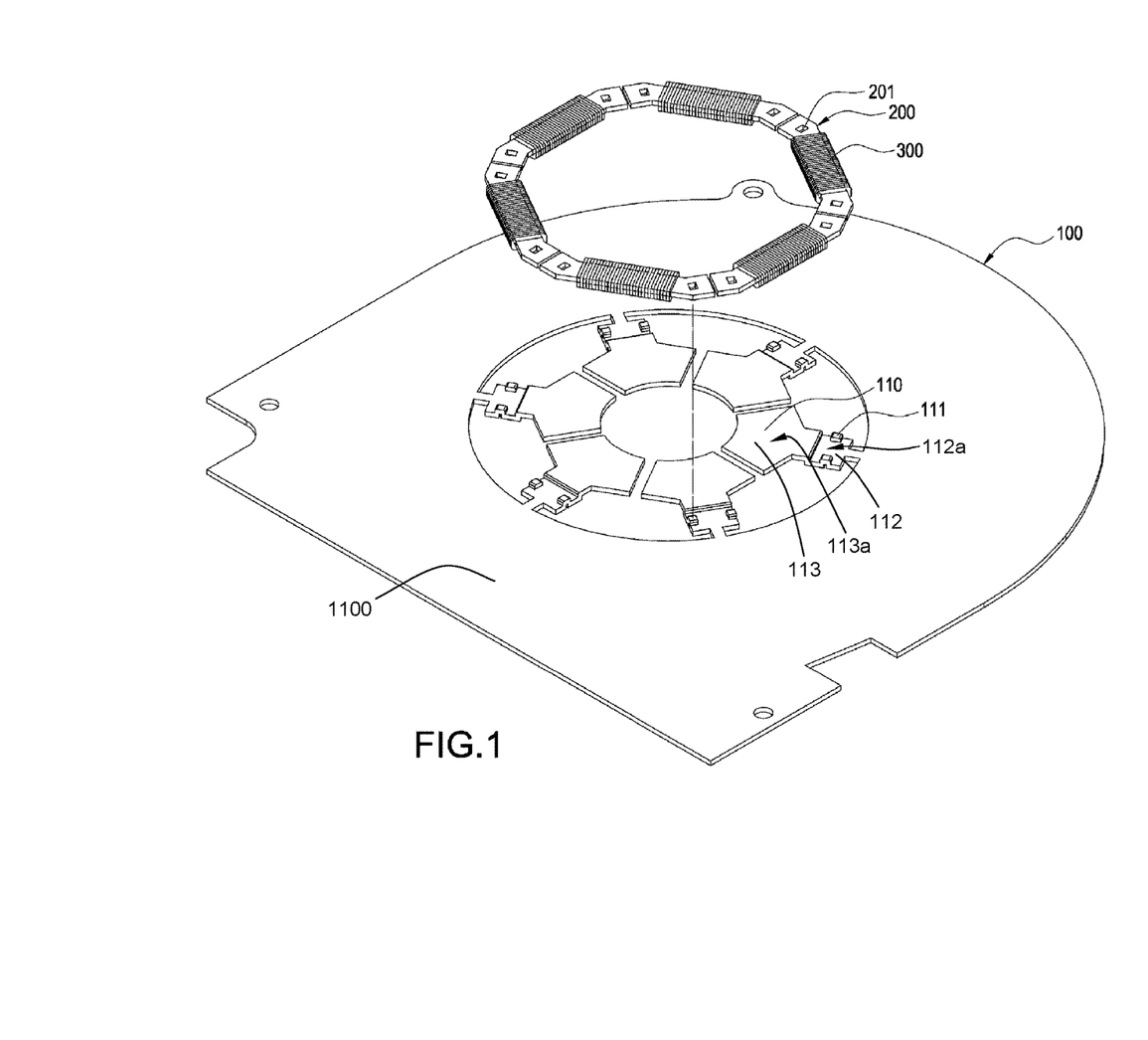
FIG. 1 is an exploded view of a motor stator structure in accordance with a first embodiment of this disclosure.
Figure 2:
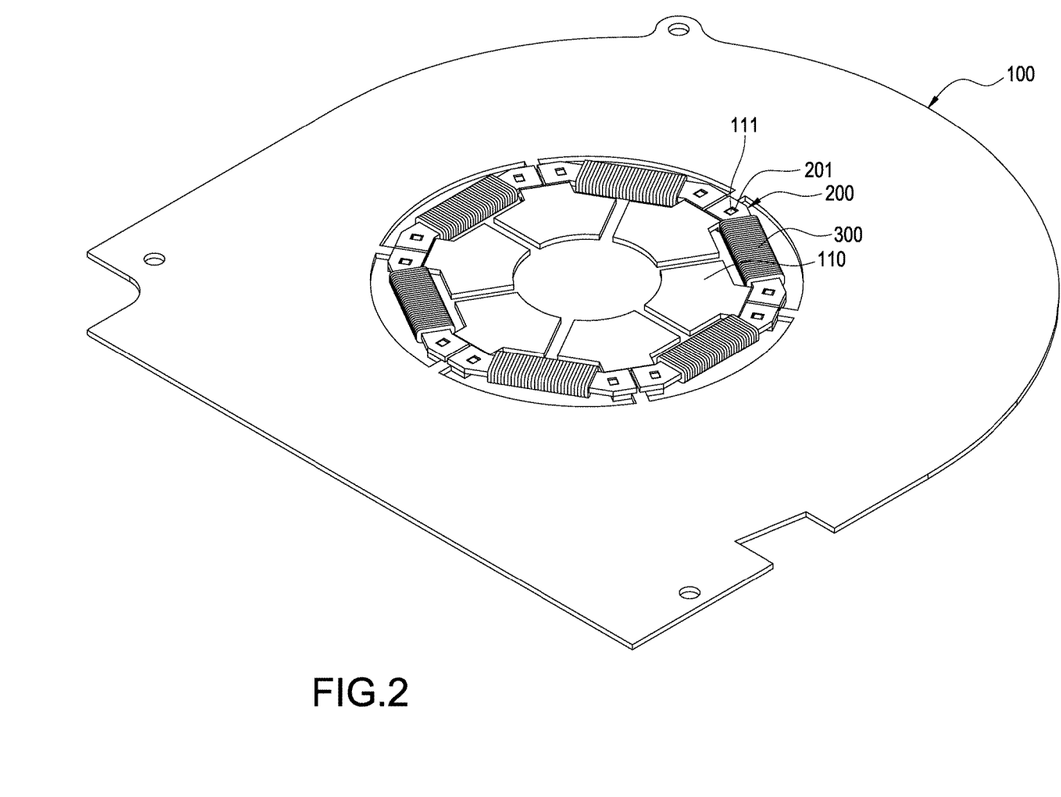
FIG. 2 is a perspective view of a motor stator structure in accordance with the first embodiment of this disclosure.

With reference to FIGS. 1 and 2 for a motor stator structure in accordance with the first embodiment of this disclosure, the motor stator structure comprises a metal plate 100, preferably made of silicon steel sheet. The metal plate 100 has a body 1100 and a plurality of teeth 110 formed around the metal plate 100 by a stamping method and arranged with an interval apart from one another, and outer ends of the adjacent teeth 110 are connected with each other. In addition, each tooth 110 includes a connecting part 112 and an induced part 113, each connecting part 112 connects each induced part 113 and the body 1100, each connecting part 112 has a first top surface 112a, each induced part 113 has a second top surface 113a, there is a step between each first top surface 112a and each second top surface 113a, and each tooth 110 has a pair of latches 111 protruded from the tooth 110.

An iron core 200 spans between any two adjacent teeth 110, and the iron core 200 is preferably made of silicon steel sheet. A through hole 201 is formed between both ends of the iron core 200 and for receiving the respective latch 111 of the tooth 110, so that both ends of each iron core 200 are latched with adjacent teeth 110 to fix the iron core 200 to the metal plate 100. Both ends of each iron core 200 may be soldered to adjacent teeth 110.

Each iron core 200 has a cylindrical coil 300 wound around the iron core 200, so that a cylindrical coil 300 is disposed between any two adjacent teeth 110, and both ends of each cylindrical coil 300 are configured to be corresponsive to the adjacent teeth 110. When the cylindrical coil 300 is electrically conducted, the cylindrical coil 300 is capable of generating an induced magnetic field to polarize the teeth 110 disposed at both ends of the cylindrical coil 300.

Figure 3:
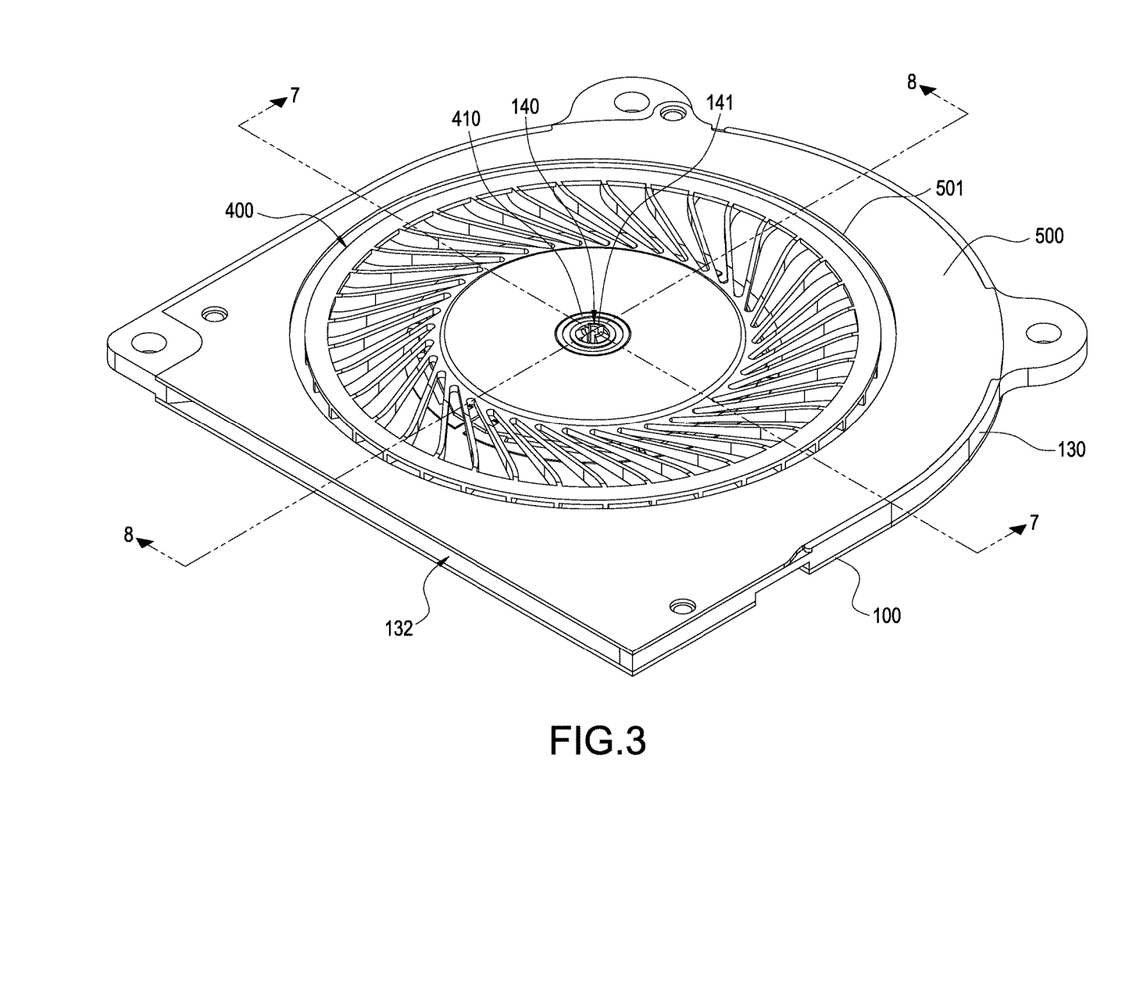
FIG. 3 is a perspective view of a motor stator structure in accordance with a second embodiment of this disclosure.
Figure 4:
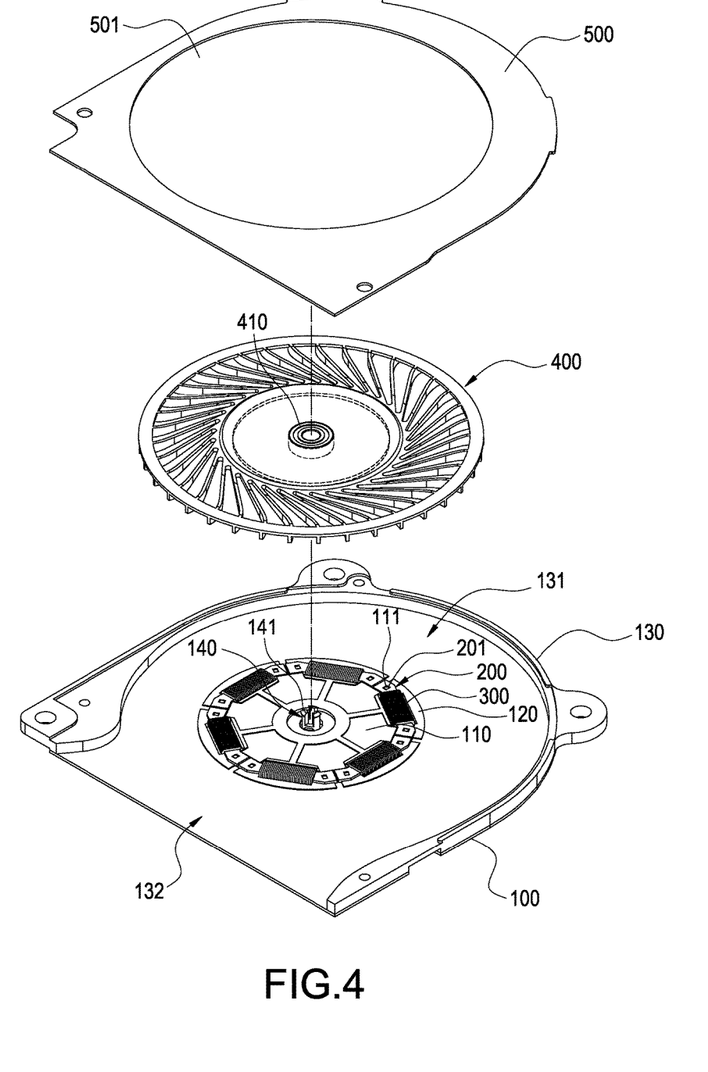
FIG. 4 is a schematic partial view of a fan in accordance with the second embodiment of this disclosure.

With reference to FIGS. 3 and 4 for a fan in accordance with the second embodiment of this disclosure, the fan comprises a metal plate 100, a coil holder 120, a frame 130, a shaft 140, a plurality of iron cores 200, a plurality of cylindrical coils 300, an impeller 400 and a cover plate 500.

In this embodiment, the metal plate 100 is preferably made of silicon steel sheet. The metal plate 100 has a plurality of teeth 110 formed thereon and connected with one another, and the teeth 110 are arranged annularly into a structure similar to the structure as described in the first embodiment.

The metal plate 100 is placed in a mold for an insert molding process, so that a coil holder 120, a frame 130 and a shaft 140 are formed on the metal plate 100 at the same time. A coil holder 120 is installed between any two adjacent teeth 110, and the frame 130 is protruded from a side of the metal plate 100 and extended along an edge of the metal plate 100 to enclose and form a flow channel 131, and the frame 130 has an air outlet 132 communicated with the flow channel 131. The shaft 140 is disposed in the flow channel 131 and situated at the center of the annularly arranged teeth 110, and a hook is formed at an end of the shaft 140 for fixing the impeller 400.

Each iron core 200 spans between two teeth 110, and both ends of each iron core 200 have a through hole 201 separately for latching each respective latch 111 of the adjacent tooth 110 to fix each iron core 200 to the metal plate 100, and both ends of each iron core 200 may be solder to the adjacent teeth 110.

Each cylindrical coil 300 is wound around the corresponsive iron core 200 and contained in the coil holder 120, so that a cylindrical coil 300 is disposed between any two adjacent teeth 110, and both ends of each cylindrical coil 300 are configured to be corresponsive to the respective adjacent teeth 110. When the cylindrical coil 300 is electrically conducted, the cylindrical coil 300 is capable of generating an induced magnetic field to polarize the teeth 110 disposed at both ends of the cylindrical coil 300.

The impeller 400 is installed in the flow channel 131, and a circular bearing 410 is installed at center of the impeller 400, engaged with the shaft 140, and latched by the hook 141. The impeller 400 has a permanent magnet 420 installed thereon. When the cylindrical coil 300 is electrically conducted, the magnetic repulsion between the permanent magnet 420 and the teeth 110 drives the impeller 400 to rotate. In this embodiment, the longitudinal direction of the cylindrical coil 300 is aligned with the radial direction of the rotation of the impeller 400, and the permanent magnet 420 is configured to be corresponsive to the cylindrical coil 300, and the permanent magnet 420 and the cylindrical coil 300 are stacked along the axial direction of the rotation of the impeller 400, so that the permanent magnet 420 and the cylindrical coil 300 has an air gap formed in the axial direction of the rotation of the impeller 400.

A cover plate 500 is provided for covering the top of the frame 130, and the cover plate 500 has an air inlet 501 formed at a position corresponsive to the impeller 400. When the impeller 400 rotates, air is sucked through the air inlet 501, and the airflow passes through the flow channel 131 and blows out from the air outlet 132.

Figure 9:
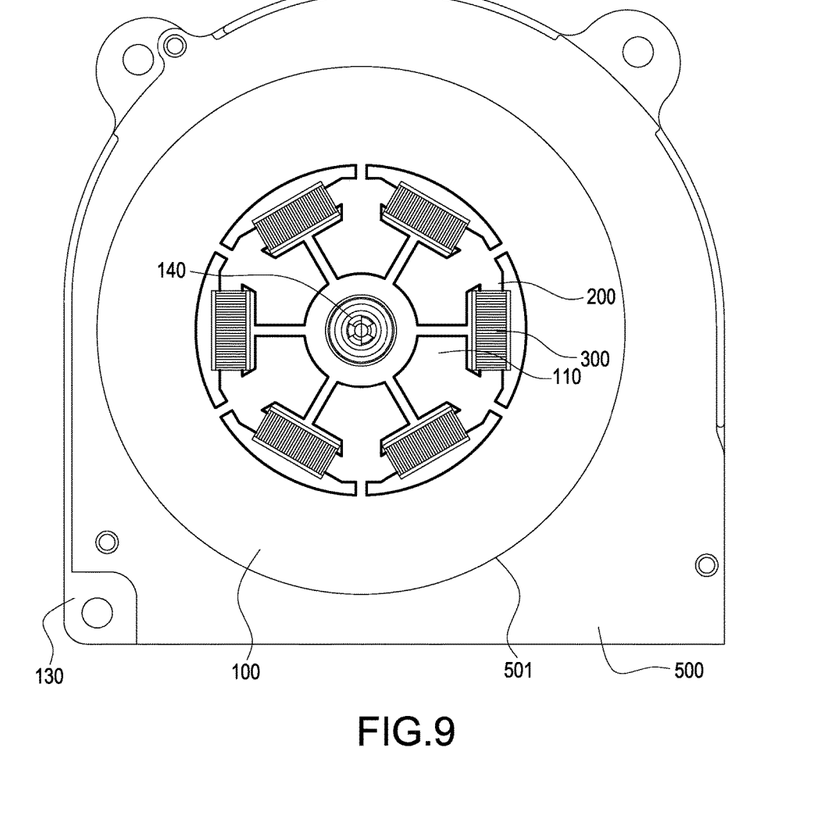
FIG. 9 is a schematic view of a motor stator structure in accordance with a third embodiment of this disclosure.

With reference to FIG. 9 for a motor stator structure in accordance with a third embodiment of this disclosure, the motor stator structure comprises a metal plate 100 preferably made of silicon steel sheet. The metal plate 100 has a plurality of teeth 110 and a plurality of iron cores 200 formed thereon and arranged annularly. The teeth 110 are arranged with an interval apart from one another, and outer ends of the teeth 110 are connected to one another, and an iron core 200 is formed between any two adjacent teeth 110, and both ends of each iron core 200 are connected to the adjacent teeth 110. Each iron core 200 has a cylindrical coil 300 wound around the iron core 200, so that a cylindrical coil 300 is disposed between any two adjacent teeth 110, and both ends of each cylindrical coil 300 are configured to be corresponsive to the respective adjacent teeth 110. When the cylindrical coil 300 is electrically conducted, the cylindrical coil generates an induced magnetic field for polarizing the teeth 110 at both ends of the cylindrical coil.

Figure 5:
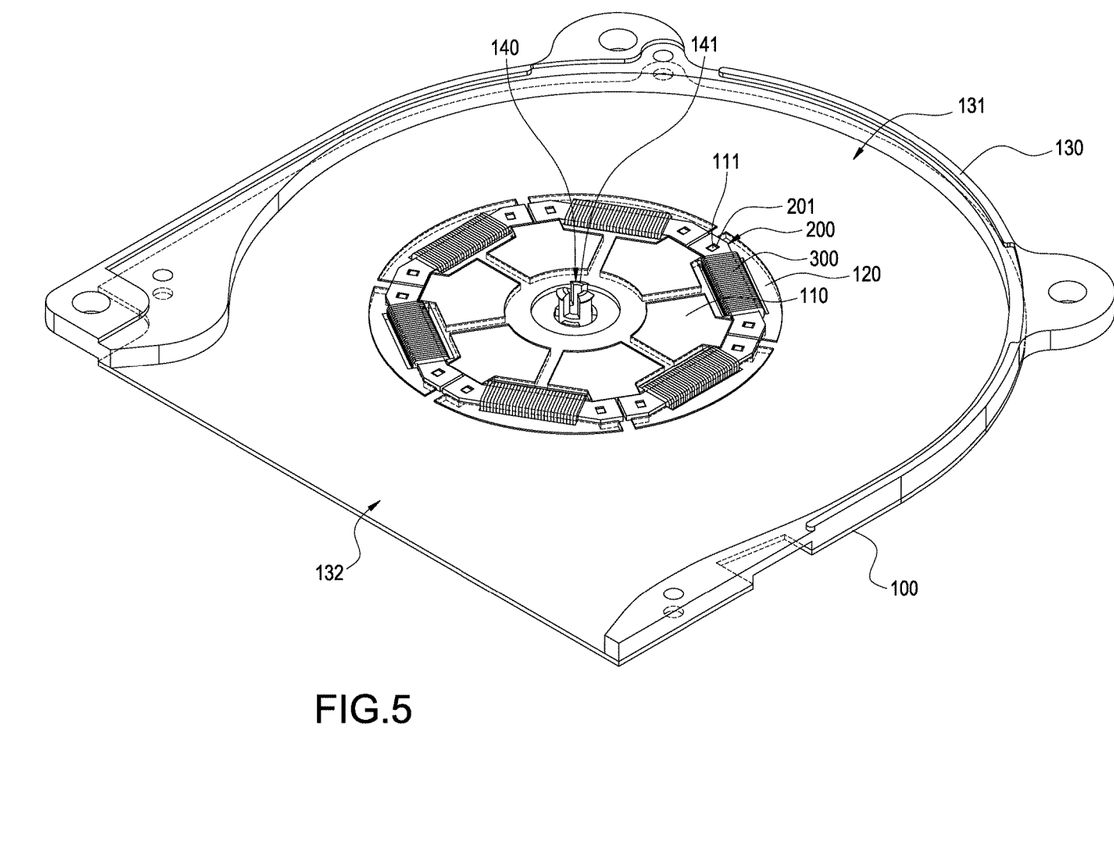
FIG. 5 is a schematic view of a first positioning module in accordance with a preferred embodiment of this disclosure.
Figure 6:
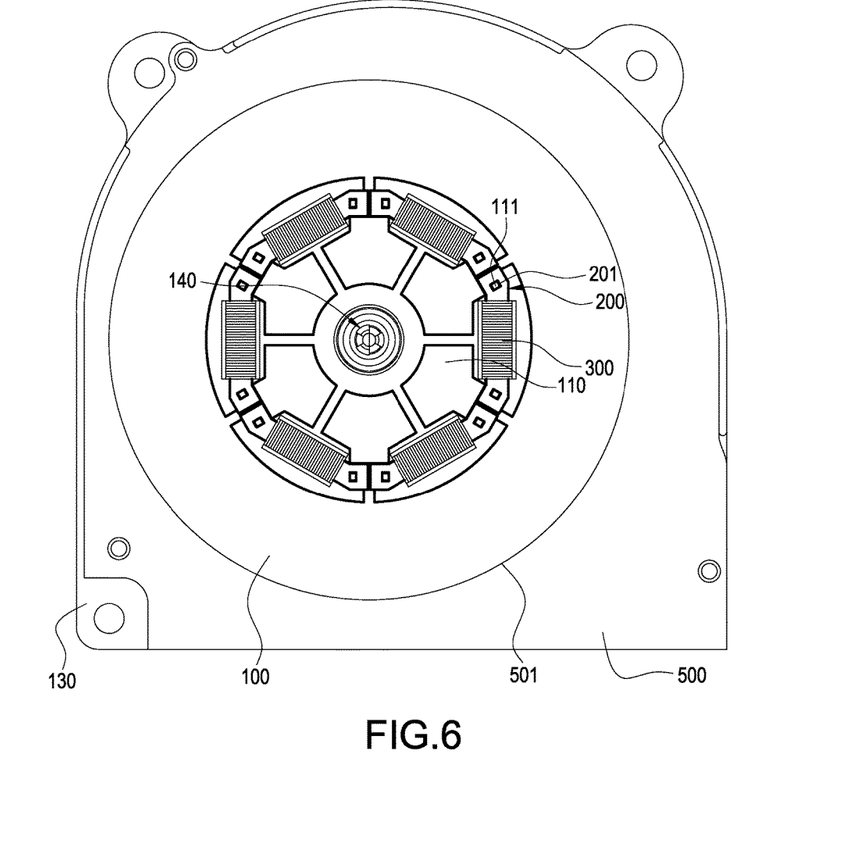
FIG. 6 is a top view of a fan in accordance with the second embodiment of this disclosure.
Figure 7:
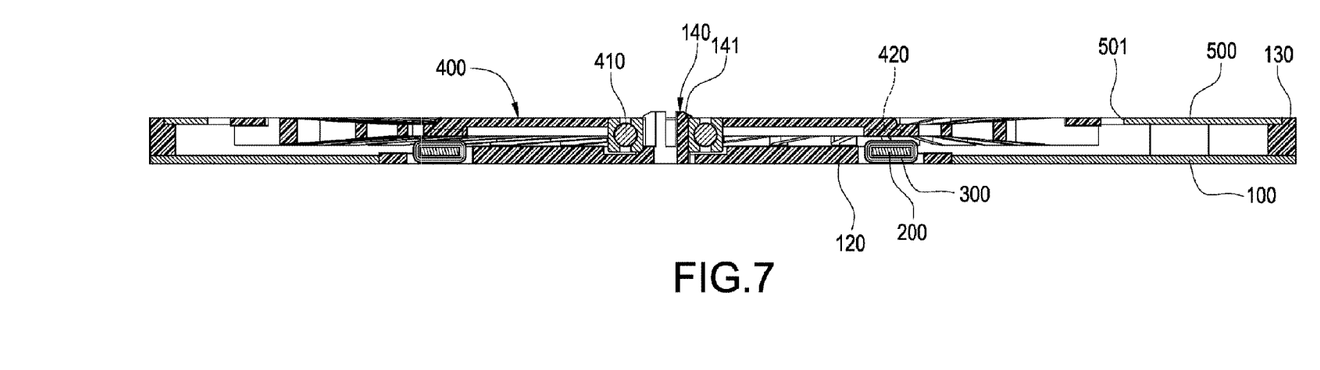
FIG. 7 is a cross-sectional view of a fan in accordance with the second embodiment of this disclosure.
Figure 8:
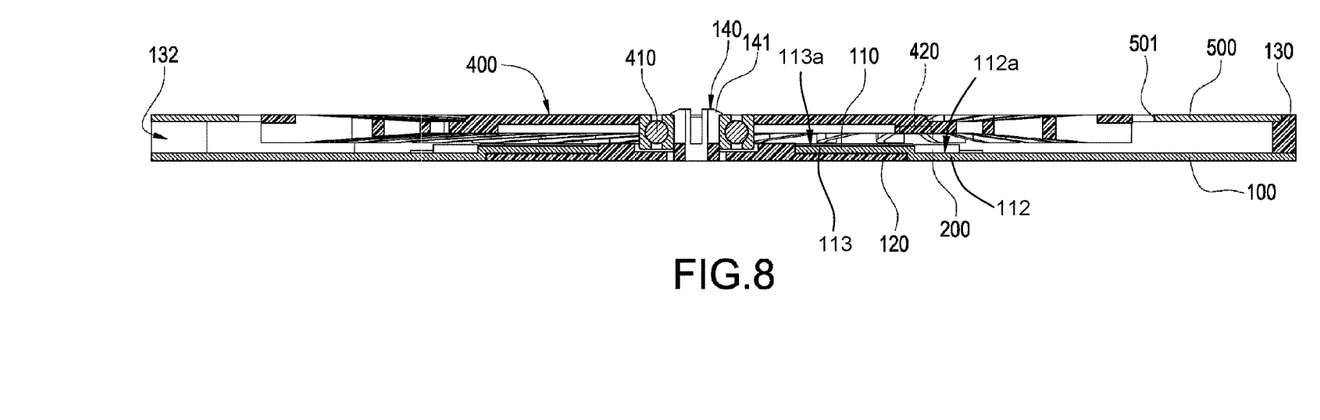
FIG. 8 is another cross-sectional view of a fan in accordance with the second embodiment of this disclosure.
Figure 10:
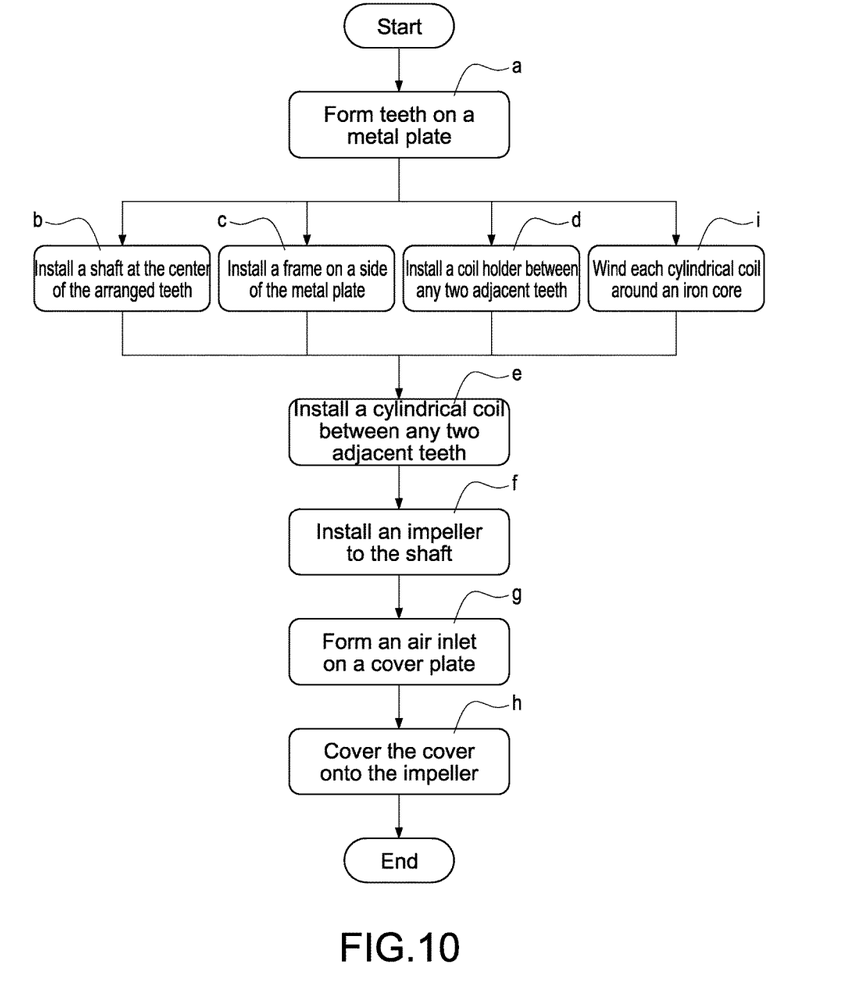
FIG. 10 is a flow chart of a manufacturing method of a fan in accordance with a fourth embodiment of this disclosure.

With reference to FIGS. 4, 5 and 10 for a manufacturing method of a fan in accordance with a fourth embodiment of this disclosure, the manufacturing method for manufacturing the aforementioned fan comprises the following steps.

In Step (a), a metal plate 100 is provided, and a portion of the metal plate 100 is removed by a stamping method, and the metal plate 100 has a plurality of teeth 110 formed thereon and arranged annularly. The outer ends of the teeth 110 are connected to each other and the teeth 110 are arranged annularly with a hollow center.

In Step (b), the metal plate 100 is put into a mold and a shaft 140 is formed at the center of the annularly arranged teeth 110 by an insert molding process, and a hook 141 is formed at an end of the shaft 140 for fixing the impeller 400.

In Step (c), the metal plate 100 is put into a mold and a frame 130 is formed on the metal plate 100 by an insert molding process, and the teeth 110 are enclosed by the frame 130.

In Step (d), the metal plate 100 is put into a mold, and a coil holder 120 is installed between any two adjacent teeth 110 by an insert molding process and provided for accommodating the cylindrical coil 300.

The aforementioned steps (b)~(d) may be carried out separately without being limited to any particular sequence. Any two of the steps (b)~(d) may be carried out simultaneously. In this embodiment, the metal plate 100 is preferably put into the mold, and the steps (b)~(d) are carried out at the same time by the insert molding process to form the frame 130, the shaft 140 and the coil holder 120 simultaneously.

In Step (e), a cylindrical coil 300 is installed between any two adjacent teeth 110. Each cylindrical coil 300 is wound around an iron core 200, and both ends of the iron core 200 are connected to the respective adjacent teeth 110, and the cylindrical coil 300 is accommodated in the coil holder 120. Wherein, iron core 200 may be formed together with the teeth 110 in Step (a) by the stamping method (as shown in FIG. 9).

In Step (f), an impeller 400 is pivotally installed to the shaft 140.

In Step (g), a cover plate 500 is provided, and an air inlet 501 is formed on the cover plate 500.

In Step (h), the cover plate 500 is installed to the top of the frame 130 and covered onto the impeller 400.

The manufacturing method of a fan in accordance with this disclosure further comprises the Step (i), wherein an iron core 200 is provided, and then Step (e) is carried out. In Step (e), each cylindrical coil 300 is wound around each respective iron core 200, and then both ends of the iron core 200 are coupled to the adjacent teeth 110 respectively by a latching or soldering method, but this disclosure is not limited to such arrangements only.

In the manufacturing method of a fan in accordance with this disclosure, the motor stator structure has the teeth 110 formed on the metal plate 100 to simplify the conventional structure, and thus not just reducing the volume of the fan only, but also lowering the manufacturing cost of the fan.

While this disclosure has been described by means of specific embodiments, numerous modifications and variations could be made thereto by those skilled in the art without departing from the scope and spirit of this disclosure set forth in the claims.

What is claimed is:

1. A motor stator structure, comprising:
   a metal plate, forming a body and a plurality of teeth connected to one another and annularly arranged, wherein each of the teeth includes a connecting part and an induced part, each of the connecting parts connects each of the induced parts and the body, each of the connecting parts has a first top surface, each of the induced parts has a second top surface, and there is a step between each of the first top surfaces and each of the second top surfaces;
   a cylindrical coil, disposed between any two adjacent teeth, and both ends of the cylindrical coil being configured corresponsive to the adjacent teeth respectively; and
   a plurality of iron cores, each spanning across a pair of adjacent teeth, and each cylindrical coil being wound around each respective iron core;
   wherein each iron core has both ends latched to the adjacent teeth respectively;
   wherein each iron core has a through hole formed separately at both ends of the iron core, and each tooth has a latch protruded from the tooth and configured to be corresponsive to each respective through hole.

2. The motor stator structure as claimed in claim 1, wherein each iron core has both ends soldered to the adjacent teeth respectively.

3. A fan, comprising:
   a metal plate, forming a body and a plurality of teeth connected to one another, and arranged annularly, wherein each of the teeth includes a connecting part and an induced part, each of the connecting parts connects each of the induced parts and the body, each of the connecting parts has a first top surface, each of the induced parts has a second top surface, and there is a step between each of the first top surfaces and each of the second top surfaces;
   a plurality of cylindrical coils, each being arranged between any two adjacent teeth, and both ends of the cylindrical coil being configured to be corresponsive to the adjacent teeth respectively;
   a frame, protruded from a side of the metal plate, and extended along an edge of the metal plate to enclose and form a flow channel, and an air outlet being formed at the frame and communicated with the flow channel;
   an impeller, installed in the flow channel; and
   a plurality of iron cores, each spanning across the respective adjacent teeth, and each cylindrical coil being wound around the respective iron core;
   wherein each iron core has both ends latched to the adjacent teeth respectively;
   wherein each iron core has a through hole formed separately at both ends of the iron core, and each tooth has a latch protruded from the tooth and configured to be corresponsive to each respective through hole.

4. The fan as claimed in claim 3, wherein each iron core has both ends soldered to the adjacent teeth respectively.

5. The fan as claimed in claim 3, wherein the metal plate has a shaft protruded from the metal plate and disposed in the flow channel and at the center of the annularly arranged teeth, and the impeller has a circular bearing installed at the center of the impeller and engaged with the shaft.

6. The fan as claimed in claim 3, further comprising a coil holder installed between any two adjacent teeth, and the cylindrical coil is accommodated in the coil holder.

7. The fan as claimed in claim 3, wherein the frame has a cover plate covered onto the top of the frame and an air inlet formed at the cover plate and configured to be corresponsive to the impeller.

* * * * *